UNITED STATES PATENT OFFICE.

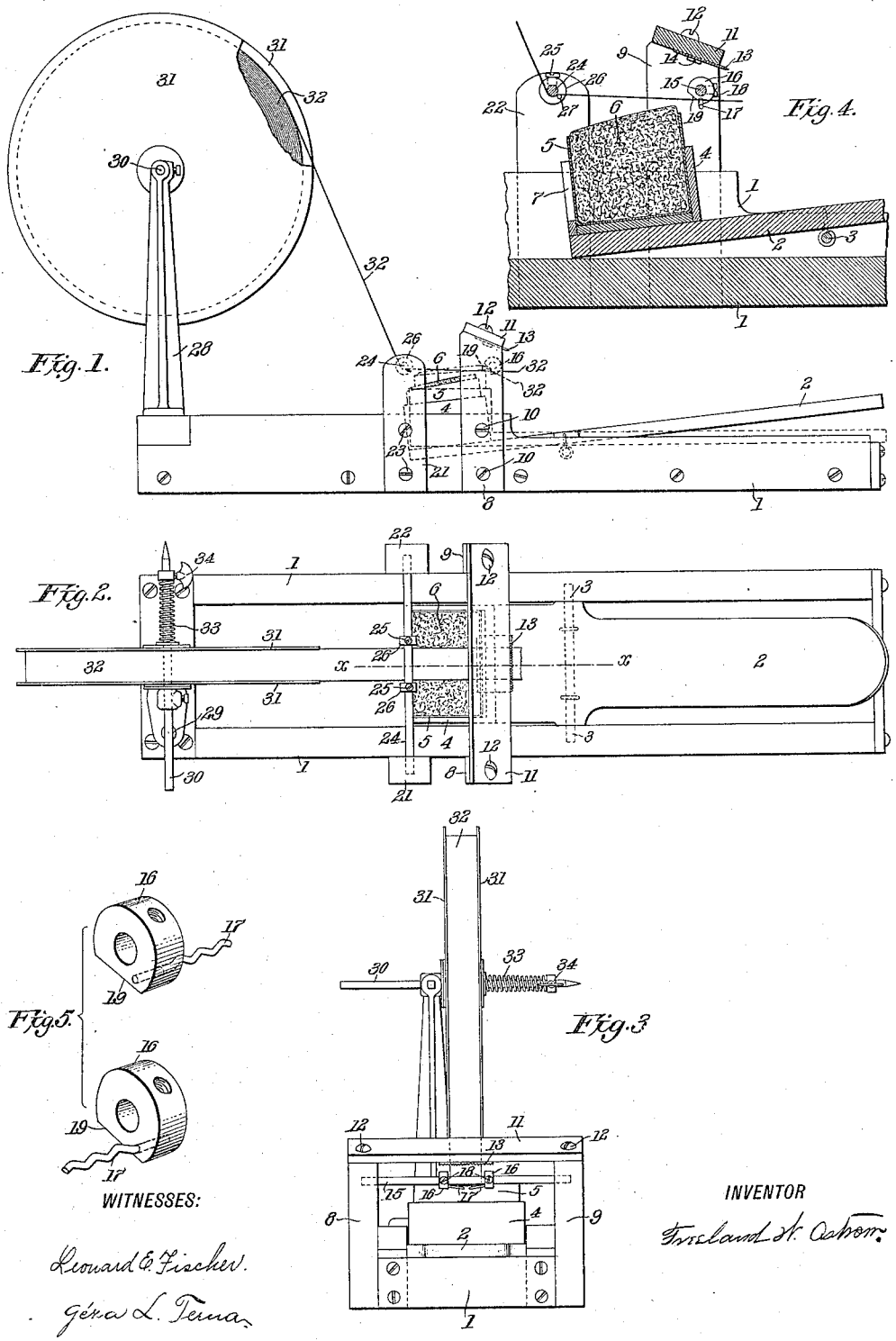

FREELAND W. OSTROM, OF NEWARK, NEW JERSEY, ASSIGNOR TO THE SINGER MANUFACTURING COMPANY, A CORPORATION OF NEW JERSEY.

DEVICE FOR SUPPORTING AND DELIVERING TAPE FOR WRAPPING PURPOSES.

1,166,074.  Specification of Letters Patent.  Patented Dec. 28, 1915.

Application filed February 27, 1913. Serial No. 751,136.

*To all whom it may concern:*

Be it known that I, FREELAND W. OSTROM, a citizen of the United States, residing at Newark, in the county of Essex and State of New Jersey, have invented certain new and useful Improvements in Devices for Supporting and Delivering Tape for Wrapping Purposes, of which the following is a specification, reference being had therein to the accompanying drawings.

This invention relates to improvements in devices for supporting and delivering tape for binding purposes, and has for its object to provide improved means for delivering the tape from the supply to the operator in condition for convenient application to a package.

Referring to the drawings, Figure 1 is a view in side elevation, Fig. 2 a plan view, and Fig. 3 an end view of the improved device, together with tape reel and tape, Fig. 4 a central vertical section on the line $x$—$x$, Fig. 2, and Fig. 5 a view in perspective of one set or pair of edge-guides provided with a modified form of tape-support.

Referring to the figures, 1 represents the frame of the device, 2 a manually operated lever pivoted at 3 in said frame and provided with a cup-holder 4 in which is seated a cup or receptacle 5 normally containing sufficient water or other liquid to properly saturate the moistening substance 6 held therein, said cup at its rear or inner side being provided for the greater portion of its depth with an opening 7 to facilitate the convenient removal of said cup, as when it is desired to cleanse or renew the moistening substance.

8 and 9 represent oppositely arranged uprights secured by screws, as 10, to the frame 1, 11 a cutter blade carrier secured by screws, as 12, to the upper ends of said uprights and provided with a serrated cutting blade 13 secured by screws, as 14.

15 represents an edge-guide-carrying bar mounted in said uprights and provided with edge-guiding collars, as 16, which in turn are provided with tape-supports, as 17, shown in Figs. 1, 3 and 4 as slightly inclined from the horizontal, and in Fig. 5 as consisting of crimped or notched wire, said guiding collars being held against accidental movement by screws, as 18, and the forward set being cut away as at 19 to avoid contacting with the free edge of the cup 5 when the latter is in its raised position, as shown in dotted lines, Fig. 1.

21 and 22 represent oppositely arranged brackets secured by screws, as 23, to the frame 1, and in the upper ends of said brackets is mounted a tape-guide rod 24 on which is adjustably secured by screws, as 25, a second set or pair of edge-guiding collars, as 26, each being provided with a tape-support, as 27.

28 represents a tape-supply bracket secured by screws, as 29, upon the frame 1, and at its upper end provided with an adjustably secured rod 30 on which are mounted to rotate oppositely arranged disks, as 31, and tape supply or roll 32, a spring 33 and an adjustably secured collar 34 acting to brake said disk and tape roll against accidental movement.

As shown in the figures, the tape is passed from the supply between the guide-rod 24 and tape-supports 27, over the moistening substance and between the edge-guide-carrying bar 15 and tape-supports 17, and the edge-guide collars 16 and 26 are adjusted to guide the tape in a substantially direct line from the supply to the supports, and when the moistening substance is brought into contact with the tape by a rocking movement of the lever 2 it causes the free end of the tape to be forced from its full to dotted line position, as shown in Fig. 1, making it more convenient for the operator to grasp such free end, and also reduces to a minimum the waste incident to the first use of the tape after an idle period of sufficient length to destroy its adhesive action.

As the tape is drawn from the supply with its adhesive surface downward, it will be evident that such surface will be in a moistened condition when drawn from contact with the moistening substance over the supports 17; but if such supports were arranged parallel with the width of the tape and allowed to remain in contact with a given point of its adhesive surface for a substantial length of time, the tape would become attached to the supports and its travel from the supply would be more or less resisted; accordingly, it has been found advisable to construct or arrange the support or supports so as to reduce the effective or supporting surface thereof to a minimum.

In the practical use of the device, the operator first rests her hand on the outer end of the lever 2, which causes the moistening substance to be brought into contact with the under or adhesive surface of the tape, then by taking hold of the free end of the tape she draws from the supply the amount required, and in the act of severing the tape by bringing it into contact with the cutter 13 raises her hand off the lever, when the moistening substance is allowed to drop clear of the tape, as shown in Fig. 4, thus leaving it out of engagement with the tape except when manually manipulated to deliver it in condition for application to a package.

What I claim is:—

1. In a device for supporting and delivering tape for wrapping purposes, the combination with a holder for a mass of tape, a cutter for severing said tape, and a moistening substance located between said mass of tape and said cutter, of a pivoted lever upon the inner end portion of which is arranged said moistening substance, its outer end portion being arranged at the side of the cutter opposite to that of said moistening substance and adapted to be manually controlled to move the latter into engagement with said tape as it is drawn from the supply.

2. In a device for supporting and delivering tape for wrapping purposes, the combination with a holder for a mass of tape, a cutter for severing said tape, a moistening substance normally out of engagement with said tape, and means located at opposite sides of said moistening substance for supporting said tape, of a pivoted lever upon the inner end portion of which is arranged said moistening substance, its outer end portion being arranged at the side of the cutter opposite to that of said moistening substance and adapted to be manually controlled to move the latter into engagement with said tape as it is drawn from the supply.

3. In a device for supporting and delivering tape for wrapping purposes, the combination with a holder for a mass of tape, a cutter for severing said tape, a moistening substance normally out of engagement with said tape, and means located at opposite sides of said moistening substance for supporting said tape including a notched support, of manually controlled means including a pivoted lever for moving said moistening substance into engagement with said tape as it is drawn from the supply.

4. In a device for supporting and delivering tape for wrapping purposes, the combination with a holder for a mass of tape, a cutter for severing said tape, a moistening substance normally out of engagement with said tape, and means located at opposite sides of said moistening substance for supporting and guiding said tape, of a pivoted lever upon the inner end portion of which is arranged said moistening substance, its outer end portion being arranged at the side of the cutter opposite to that of said moistening substance and adapted to be manually controlled to move the latter into engagement with said tape as it is drawn from the supply.

5. In a device for supporting and delivering tape for wrapping purposes, the combination with a holder for a mass of tape, a moistening substance normally out of engagement with said tape, a cutter for severing said tape, and supports for normally holding said tape in a given plane including a notched support, of a pivoted lever the inner end portion of which is provided with a receptacle normally containing a liquid within which said moistening substance is arranged, the outer end portion of said lever being arranged at the side of the cutter opposite to that of said moistening substance and manually controlled to raise the latter and said receptacle into effective relationship with said tape as it is drawn from the supply.

6. In a device for supporting and delivering tape for wrapping purposes, the combination with a holder for a mass of tape, a moistening element normally out of engagement with said tape, a cutter for severing said tape, and supports for normally holding said tape in a given plane including a notched support, of a pivoted lever the inner end portion of which is provided with a receptacle normally containing a liquid within which said moistening substance is arranged, the outer end portion of said lever being arranged at the side of the cutter opposite to that of said moistening substance and manually controlled to raise the latter and said receptacle into effective relationship with said tape as it is drawn from the supply.

7. In a device for supporting and delivering tape for wrapping purposes, the combination with a holder for a mass of tape, a cutter for severing said tape, a notched support for supporting said tape in its travel from the supply to the cutter, and a moistening substance located between said mass of tape and said cutter, of means, manually held against gravitational action, for holding said moistening substance into engagement with said tape as it is being drawn from the supply, the outer end portion of said manually held means being located at the side of the cutter opposite to that of said moistening substance.

8. In a device for supporting and delivering tape for wrapping purposes, the combination with a holder for a mass of tape, a cutter for severing said tape, a notched support for supporting said tape in its travel from the supply to the cutter, and a moistening substance located between said mass of tape and said cutter, of a lever located below the line of travel of the tape and carrying at one end said moistening substance, its opposite end being arranged to permit of its manipulation by the hand of the operator simultaneously with the drawing of the tape from the supply by said hand.

In testimony whereof, I have signed my name to this specification, in the presence of two subscribing witnesses.

FREELAND W. OSTROM.

Witnesses:
 ABBIE M. DONIHEE,
 HELGER A. ANDERSON.

Copies of this patent may be obtained for five cents each, by addressing the "Commissioner of Patents, Washington, D. C."